Dec. 11, 1928.
R. McTAVISH
RENDERING APPARATUS
Original Filed March 18, 1924    2 Sheets-Sheet 1
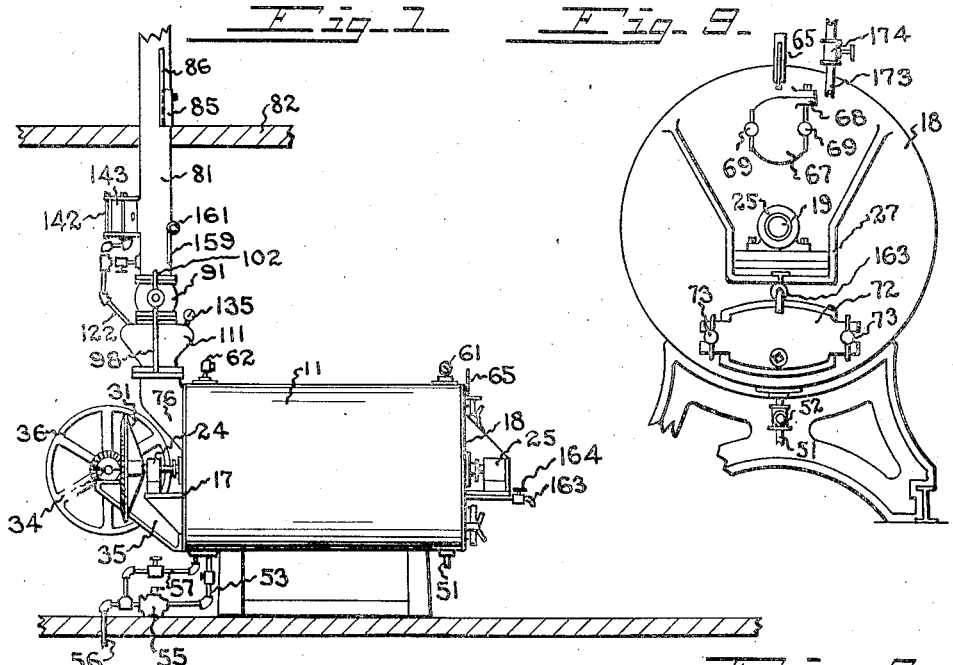
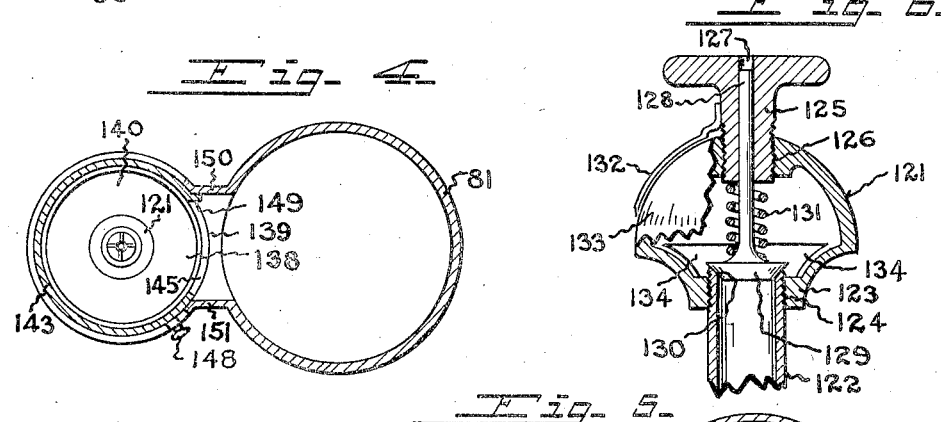
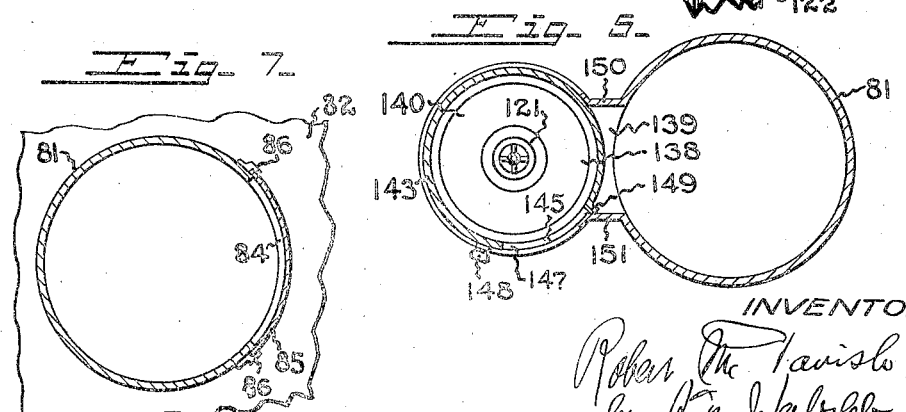
INVENTOR.

Dec. 11, 1928.
R. McTAVISH
1,695,254
RENDERING APPARATUS
Original Filed March 18, 1924     2 Sheets-Sheet 2
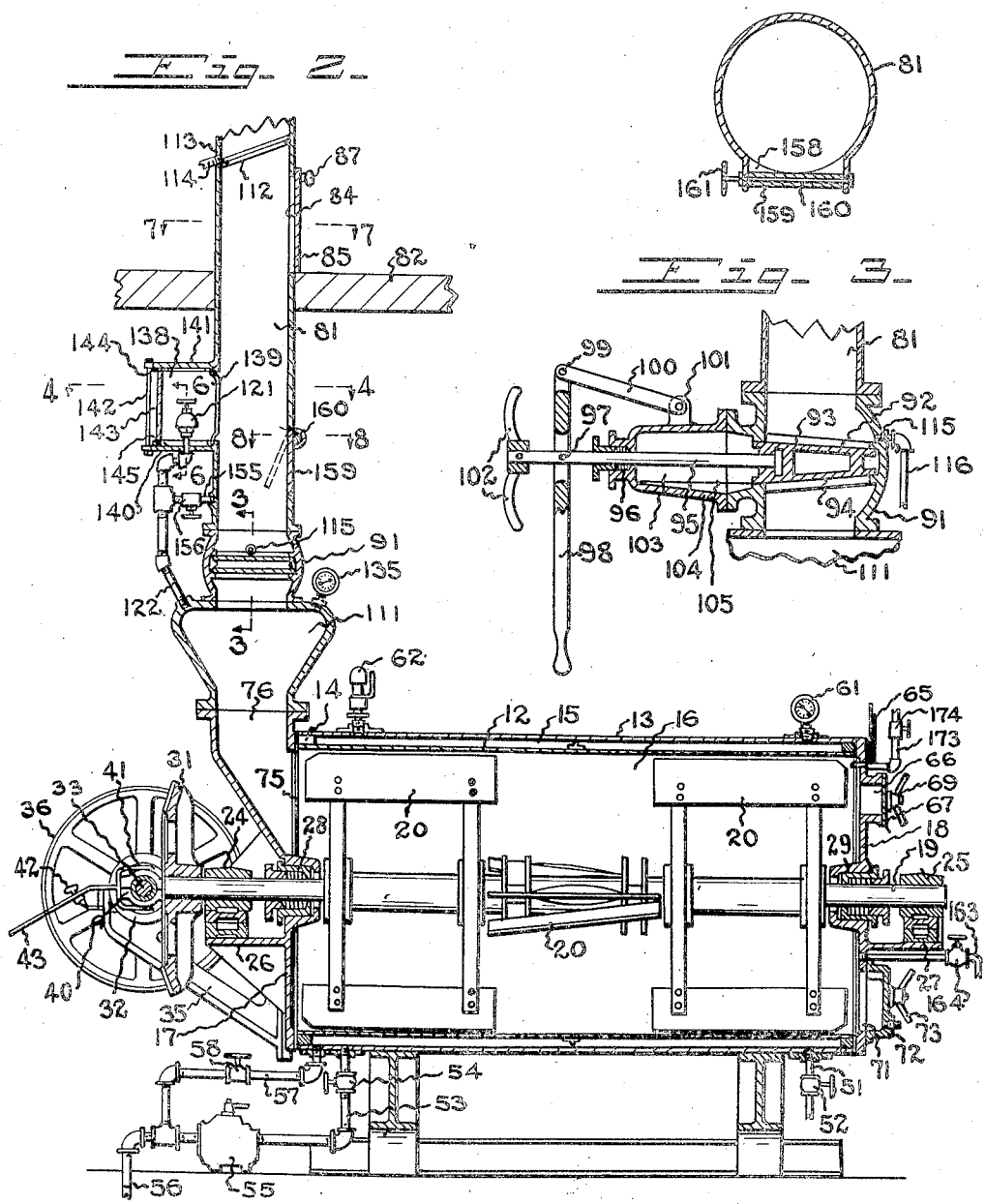
INVENTOR.
Robert McTavish, Patented Dec. 11, 1928.

1,695,254

UNITED STATES PATENT OFFICE.

ROBERT McTAVISH, OF CINCINNATI, OHIO, ASSIGNOR TO THE CINCINNATI BUTCHERS' SUPPLY COMPANY, OF CINCINNATI, OHIO, A CORPORATION OF OHIO.

RENDERING APPARATUS.

Original application filed March 18, 1924, Serial No. 700,140. Divided and this application filed December 31, 1925. Serial No. 78,651.

It is the object of my invention to provide new and useful improvements in rendering apparatus for treating preferably animal including fish products and rendering lard and grease, which latter term includes oils and tallow.

My invention is applicable for edible products and for inedible products.

It is the object of my invention to provide an apparatus wherein it is possible to so treat the materials that the rendered lard and grease shall be of good color, that is to say, that off-color or tinging of color of the rendered product shall be minimized or avoided; wherein a product may be produced which is as white as the natural product will permit; and wherein it is possible to reduce or minimize carbonization in the rendered product; wherein, further, it is possible to produce a residue suitable for animal food, which has a high content of protein, and, wherein, further, to produce a residue which is a fertilizer rich in ammonia; and, further, to provide a simple apparatus by which such results may be obtained.

I do not herein claim the method herein described, having shown, described and claimed the same in a copending application for Letters Patent of the United States on improvements in method of rendering, filed by me March 18, 1924, as Serial No. 700,140, of which this application is a division, nor do I claim the method claimed in a copending application for Letters Patent of the United States on improvements in method of rendering fat bearing animal material, filed by me October 25, 1926, as Serial No. 143,947, which is a continuation in part of my copending application Serial No. 700,140.

It is the object of my invention, further, to provide a novel rendering apparatus in which the material to be treated is received and subjected to a dry heat, instanced as a steam jacketed cylinder in which suitable paddles or stirrers operate for stirring the material and aiding in its disintegration, and to provide novel means for controlling escape of steam from the material; further, to provide novel relations of such control means; further, to provide a novel arrangement of ebullition chamber for the cooking vessel; further, to provide novel observation means; and, further, to provide novel testing means for an apparatus of this character.

The invention will be further readily understood from the following description and claims, and from the drawings, in which latter:

Fig. 1 represents a side elevation of my improved apparatus, the view showing portions thereof in section.

Fig. 2 is a vertical axial section of my improved apparatus.

Fig. 3 is a detail in vertical section taken on the line 3—3 of Fig. 2.

Fig. 4 is a horizontal cross-section, taken on the line 4—4 of Fig. 2, showing the pressure-relief means open to the stack.

Fig. 5 is a view similar to Fig. 4, showing the pressure relief means closed to the stack.

Fig. 6 is a vertical section of the relief valve, taken on the line 6—6 of Fig. 2, and partly in side elevation.

Fig. 7 is a detail of the stack and charging gate, taken on the line 7—7 of Fig. 2.

Fig. 8 is a horizontal section of a detail showing the deflecting shutter, taken on the line 8—8 of Fig. 2; and, Fig. 9 is an end elevation of the cooker.

My improved apparatus constitutes a cooker, exemplified at 11, and comprises an inner shell 12 and an outer shell 13, separated by spacing blocks 14, for forming a heating jacket 15, for the cooking compartment 16, into which the material to be treated is placed.

The cooker also comprises end walls 17, 18. A shaft 19 passes through the cooker and has stirrer-paddles 20, thereon, which are arranged to agitate the material and to move the same about in the interior of the cooker for uniformly heating the same, and for maintaining the same in divided form for proper heat permeation, and proper freeing of the rendered product.

The shaft is journaled in suitable bearings 24, 25, exemplified as on brackets 26, 27, on the end walls, the shaft also passing through suitable packings 28, 29, in the end walls for preventing the passage of contents of the cooker along the shaft to outside the cooker.

Suitable means are provided for driving the shaft, shown comprising a bevel-gear 31, secured to the shaft 19, driven by a bevel-pinion 32, on a shaft 33, journaled in bearings 34 of a bracket 35, the shaft 33 being driven by a suitable rotating member, as a pulley 36. A clutch comprising a clutch-collar 40, operated by a fork 41, pivoted on a bolt 42, secured to the bracket 35, and having a handle 43, is arranged between the bevel-pinion and the shaft for clutching the bevel-pinion and shaft together for driving the stirrer-blades in the cooker, or releasing their driving connection.

The heating jacket of the cooker has suitable connection with the heating agency, for instance, steam, by means of a steam-pipe 51, comprising a suitable valve 52, for regulating or shutting off the steam from said heating space. A discharge-pipe 53 communicates with the heating jacket, and has therein a valve 54, for regulating the discharge of heat and pressure from said heating jacket.

The discharge pipe communicates with a suitable steam-trap 55. A waste pipe 56 extends from the steam-trap. In order to provide prompt exhaust from the heating jacket 15 of the cooker, when desired, a by-pass pipe 57 connects with said jacket and by-passes the steam-trap, connecting with the waste-pipe. This by-pass pipe has a valve 58 therein.

The steam-jacket also has a pressure-gauge 61 communicating therewith to indicate the pressure in the steam-jacket. A safety valve 62 also communicates with said steam-jacket.

The cooking compartment of the cooker preferably has a thermometer 65 communicating therewith, on which the heat in the inside of the cooker and of the contents of the cooker may be read.

The end wall 18 of the cooker may be provided with an observation opening 66, closed by a cap 67, hinged by a hinge 68 to the end wall, and clamped to the wall of said opening by clamps 69 to securely close the same.

The end wall 18 is also provided with a discharge opening 71, closed by a door 72, arranged to be clamped to the wall of said opening by means of clamps 73.

The wall 17 of the cooker is provided with a charging opening 75, with which a charging mouth 76 communicates, the charging mouth being shown as part of the wall 17.

The means for charging the cooker preferably comprises a stack 81, which may be of suitable height, and preferably extends to the outside of the building in which the cooker is contained so as to serve as a vent through which the steam and odors of the cooking may pass readily from the cooker and be discharged into the outside atmosphere. It is shown as extending through the floor 82, above the cooker, exemplified as the charging floor, and is shown broken away at the top, and may extend upwardly through other floors and the roof of the building in which the cooker is located.

The material to be treated in the cooker, preferably after being suitably cut or hashed and washed, is passed through an opening 84 in the stack, the opening being readily closed by a charging door 85, exemplified as slidable in guideways 86 at the respective sides of the opening, and having a handle 87 for controlling the same.

The material passed through the charging opening is conducted through the mouth of the cooker for being treated in the cooker.

The stack preferably has a valve 91 therein, arranged for closing or substantially closing the cooker, this valve being shown as a gate-valve, comprising a gate 92 coacting with valve-seats 93, 94, and having a stem 95 extending therefrom, passing through a suitable packing 96. The outer end of the stem has articulation 97 with a lever handle 98 articulated at 99 with a link 100 pivoted at 101 to the valve-casing. The outer end of the stem may also be provided with handles 102. The valve may be operated by the lever or the latter handles. The valve 92 is arranged to be received in a cavity 103 of the valve casing 104 when the valve is retracted, and may be guided on ways 105 at the respective sides of the valve casing.

A steam chamber 111 is preferably located between the valve and the mouth of the cooker, shown as an enlargement of the stack. Its purpose is to provide a space in which ebullition of the contents of the cooker may take place, and provides a collecting chamber for steam to avoid cooking over of such contents.

The steam from the cooker passes up the stack, and portions of it condense upon the inner surface of the wall of the stack. In order to avoid the passage of such condensation back into the cooker, I prefer to provide a grooved ring-flange 112 about the interior of said wall above the opening 84, to receive such condensation and to conduct it by means of an opening 113 and a pipe 114 outside the stack.

I prefer to form an opening 115 above the valve 91, so that any condensation which may accumulate above said valve during closed condition of the valve is discharged through said opening and a waste pipe 116, so that, when the valve is opened, after a period of closure thereof, water or condensation may not drop into the cooker.

When the valve 91 is open, the interior of the cooker is open to the atmosphere, so that the steam arising from the boiling of the water in the material in the cooker will pass freely to the atmosphere.

As hereinbefore indicated, the material in the cooker is preferably subjected to pressure due to the cooking during a portion of the cooking. I provide means for relieving this pressure, and continuing evaporation from the cooker during such pressure condition therein, exemplified as comprising a relief-valve 121, shown as having communication with the collecting chamber 111, by means of a pipe 122. The relief-valve may comprise a body 123 screwed to the end of the pipe 122, as by threaded connection 124, and having thereon an adjusting handle 125, having threaded connection 126 with said body, and provided with a bore 127 in which a stem 128 of a valve 129 is slidable. The valve 129 is arranged to coact with the valve-seat 130 at the end of the pipe.

A spring 131 is interposed between the valve and the handle, the adjustment of the handle determining the resistance of the spring. The handle is provided with a finger 132 coacting with a guage 133 on the body of the valve, whereby to read the resistance pressure of the valve. The body of the valve is provided with relief openings 134.

Means are provided for ascertaining the pressure inside the cooking compartment, as by providing a pressure gauge 135, which has communication with the collecting chamber 111, by being secured in the wall thereof.

The relief-valve is preferably placed in a compartment 138 having a passage 139 communicating with the stack or vent.

The object of placing the relief-valve in communication with the stack is to permit the exhaust therefrom to be drawn off into the stack. The relief-valve is preferably placed in a compartment at the side of the stack so that the same will not obstruct the material fed through the stack into the cooker. The compartment is preferably so arranged that the exhaust may be seen and smelt when desired in order to test the state of the cooking and of the material being cooked in the cooker.

The compartment preferably comprises a casing, having a lower wall 140, an upper wall 141, spaced by tie-rods 142 and having a cylindrical side wall 143, rotatable in grooves 144, 145, respectively on the inner faces of the upper and lower walls.

The cylindrical wall is provided with an opening 147 and with a handle 148. One wall of the opening is provided with a lug 149 arranged to be alternately arrested by the side walls 150, 151, of the passage 139 between the compartment and the stack. The cylindrical wall forms a door which, when moved to the left, causes the passage to the stack to be closed and the opening in the wall to be at the outside of said passage, so that the relief valve may be viewed from the outside, and so that the exhause therefrom may also be discharged into the room in which the cooker and the operator are located, so that the operator may observe and may also smell the exhaust in order to judge the state of the cooking and the material being cooked. After such observation the door may be closed by turning the cylinder to the right, which will close the outside of the casing and place the opening of the cylindrical wall in registry with the passage to the stack.

There is also preferably a by-pass pipe 155 between the cooker and the stack beyond the closure-valve 91. It is shown connecting with the pipe of the relief valve, and with the stack above the closing valve. The pipe 155 has a valve 156 therein. When this valve is open there is communication from the cooker to the stack, by-passing the closing valve 91. It is normally closed during pressure condition in the cooking compartment.

The condition of the contents of the cooker may also be tested by the appearance and odor of the steam passing therefrom, for which purpose I provide an opening 158 in the stack, arranged to be closed by a shutter 159, hinged to the wall of the stack by a hinge 160, operated by a wheel 161, and so arranged as to swing into the stack, whereby to deflect steam from the cooker passing through the stack so that the same may be seen and smelt by the operator.

A drain-pipe 163 having a valve 164 therein is provided, through which contents of the cooker may be discharged for testing the contents. The liquid contents of the cooker may be discharged through this drain-cock after the cooking. The valve 164 is normally closed.

A live-steam pipe 173 having a valve 174 therein may communicate with the interior of the cooking compartment, as a precautionary measure for supplying moisture in said cooking compartment.

The discharge of the cooked contents preferably takes place after a preliminary short period of settling. The clarified liquid rendered contents of the cooker may be discharged through the drain pipe 163 to a suitable receptacle. The balance of the material in the cooker may be discharged through the discharge opening 71, preferably into a suitable draining device. If desired, the entire contents may be discharged through the discharge opening 71, the more liquid contents being first discharged by slight release of the door 72 and the balance discharged by removal of the door, and raking the balance of the contents out of the container.

In employing my improved device, the cut, comminuted, reduced or hashed and washed fatty material to be treated, containing the natural moisture of the material and the added moisture due to the washing, is charged into the cooking compartment, and steam is charged into the heating space, and the stirrer blades are rotated.

The material is subjected to a cooking heat, and steam generated in the material is permitted to pass through the valve 91, so as to leave the material under substantially atmospheric pressure and a temperature of substantially the boiling point of water in atmosphere, the moisture in the material being being converted into steam which envelopes the material and prevents carbonization thereof.

When moisture in the material equal to the added moisture has been converted into steam, which passes off substantially freely, and there is a rise in temperature of the material, the valve 91 is closed, whereby the steam generated from the material is placed under pressure and surrounds and envelops the material as a blanket of steam, to reduce or prevent the danger of carbonization of the material, and the pressure of steam in the heating steam jacket being however preferably reduced to avoid excess heat and pressure in the cooking compartment of the cooker. The pressure and the consequent temperature in the cooking compartment may be regulated by means of the relief valve 121, which is adjusted to the pressure desired in the cooking compartment after closure of the valve 91.

Puffs of steam will proceed from the relief valve as long as the pressure in the cooking compartment is above the desired pressure, which puffs of steam may be viewed by opening the door formed by the cylindrical wall 143 in the compartment 138, the viewing and smelling of this ejected steam being a test of the condition of the cooking. Extended interruptions in or cessation of such puffs of steam indicate a practical completion of the cooking, whereupon the supply of heating steam is interrupted and the valve 156 is opened, for relief of pressure in the cooking compartment and the discharge of steam into the stack, and the valve 91 is opened upon sufficient relief of such pressure to prevent ejection of material in the cooking compartment therethrough.

If danger of undesirable rise in temperature during the cooking is perceived, live steam or water may be placed into the cooking compartment, by opening the valve 174, to prevent carbonization of the rendered product and of the cracklings.

When pressure on the material is thus released, the material being at a higher temperature than 212° F., all the moisture above the natural moisture in atmosphere, will be driven out of the material, especially the cracklings, by the presence of the high temperature in the rendered material and residue.

After a preferably short interval of ten or fifteen minutes permitted for a preliminary settling of the cooked material after such relief of pressure thereon, the rotation of the paddles 20, having been stopped, the drain valve 164 is opened for discharge of the more clarified and liquid portion of the rendered material. The balance of the material may be dumped or scraped through the discharge opening 71.

While I have described my improved apparatus in connection with the method of rendering shown, described and claimed in my aforementioned copending application, it is obvious that my improved apparatus and portions thereof are applicable for other purposes.

Having thus fully described my invention, what I claim as new, and desire to secure by Letters Patent, is:

1. In a rendering apparatus of the character described, the combination of a cooking vessel comprising a cooking compartment, stirrers in said cooking compartment, an escape stack for the free escape of steam from from said cooking compartment, said escape stack connecting with said cooking compartment, a valve in said escape stack to shut off said escape of steam, a by-pass passage whose respective ends connect respectively with said cooking compartment and with said stack and by-passing said valve, a valve in said by-pass passage, said by-pass passage and said last-named valve being of materially less capacity than said stack and said first-named valve, an automatic relief valve having connection with said by-pass passage between the end of said by-pass passage connecting with said cooking compartment and said second-named valve, said automatic relief valve arranged to open by excess pressure in said cooking compartment, and said automatic relief valve comprising means for adjusting the pressures at which it opens, and an enclosure for said automatic relief valve, the interior of said enclosure communicating with the interior of said stack.

2. In a rendering apparatus of the character described, the combination of a cooking vessel comprising a cooking compartment, stirrers in said cooking compartment, a combined charging and steam escape stack connecting with said cooking compartment for charging material into said cooking compartment and for the free escape of steam from said cooking compartment, a shut-off valve in said escape stack shutting off said escape of steam, a by-pass passage the respective ends whereof connect respectively with said cooking compartment and with said stack, said by-pass passage by-passing said valve, a valve in said by-pass passage, said by-pass passage and said last-named valve of materially less capacity than said stack and said first-named valve, an automatic relief valve connecting with said cooking compartment and arranged to open by pressure in said cooking compartment, said automatic relief valve comprising means for adjusting the pressure at which it so opens, a housing in which said automatic relief valve is located, said housing communicating with the interior of said stack through a passageway having an opening, and means for supporting said housing at the side of said stack, said housing comprising a movable wall arranged for closing said passageway between the housing and said stack.

In testimony whereof, I have hereunto signed my name.

ROBERT McTAVISH.